(12) United States Patent
Burke

(10) Patent No.: US 9,261,056 B2
(45) Date of Patent: Feb. 16, 2016

(54) INTAKE ENHANCEMENT SYSTEM FOR A VEHICLE

(76) Inventor: Frederico Burke, Alhambra, CA (US)

(*) Notice: Subject to any disclaimer, the term of this patent is extended or adjusted under 35 U.S.C. 154(b) by 75 days.

(21) Appl. No.: 13/135,062

(22) Filed: Jun. 24, 2011

(65) Prior Publication Data

US 2012/0325181 A1 Dec. 27, 2012

(51) Int. Cl.
| F02M 15/00 | (2006.01) |
| F01P 3/22 | (2006.01) |
| F02M 31/20 | (2006.01) |
| F02B 29/04 | (2006.01) |
| F01P 3/20 | (2006.01) |

(52) U.S. Cl.
CPC ....... *F02M 31/20* (2013.01); *F01P 3/20* (2013.01); *F02B 29/0443* (2013.01); *Y02T 10/126* (2013.01); *Y02T 10/146* (2013.01)

(58) Field of Classification Search
CPC ....... F01P 7/14; F01P 11/02; F01P 2003/001; F01P 2003/005; F02B 2029/04; F02B 29/0443; F02B 37/0052; F02B 29/0475; F02B 29/0493; F02M 15/06; F02M 31/20; F02M 37/20; F02M 21/00; F02M 13/002
USPC ........................................................ 123/540
See application file for complete search history.

(56) References Cited

U.S. PATENT DOCUMENTS

| 3,141,293 | A | * | 7/1964 | Crooks | 60/599 |
| 4,169,436 | A | * | 10/1979 | Welch et al. | 123/51 B |
| 4,491,117 | A | * | 1/1985 | Koide | 123/541 |
| 4,938,036 | A | * | 7/1990 | Hodgkins et al. | 62/323.1 |
| 6,854,513 | B2 | * | 2/2005 | Shirota et al. | 165/203 |
| 7,367,292 | B2 | * | 5/2008 | Vath | 123/41.31 |
| 7,621,150 | B2 | * | 11/2009 | Kadle et al. | 62/513 |
| 7,637,292 | B2 | * | 12/2009 | Handa | 141/82 |
| 7,658,183 | B1 | * | 2/2010 | Johnson | 123/540 |
| 2005/0056470 | A1 | * | 3/2005 | Jeong | 180/65.3 |
| 2007/0006853 | A1 | * | 1/2007 | Fults et al. | 123/540 |
| 2009/0166022 | A1 | * | 7/2009 | Desai et al. | 165/279 |

\* cited by examiner

*Primary Examiner* — Lindsay Low
*Assistant Examiner* — Syed O Hasan
(74) *Attorney, Agent, or Firm* — Kenneth L. Green; Averill & Green

(57) ABSTRACT

An intake enhancement system is arranged for incorporating with a vehicle which includes a combustion engine and a heat exchanger for generating a cooling effect. The intake enhancement system includes an intake cooling unit for delivering a combustion element to the combustion engine, wherein the intake cooling unit is thermally conducted with the heat exchanger for heat-exchanging the combustion element with heat exchanging agent of the heat exchanger so as to substantially cool down the combustion element along the intake cooling unit before the combustion element delivers to the combustion engine.

6 Claims, 10 Drawing Sheets

INTAKE ENHANCEMENT SYSTEM FOR A VEHICLE

BACKGROUND OF THE PRESENT INVENTION

1. Field of Invention

The present invention relates to a vehicle fuel system, and more particularly to an intake enhancement system, which substantially cools the air/fuel intake before the air/fuel enters into the internal combustion engine so as to maximize the efficiency of the internal combustion engine.

2. Description of Related Arts

It is a scientific fact that an internal combustion engine operates less efficiently at warmer ambient temperatures. Accordingly, warmer air intake combined with warm fuel creates a potentially lean condition or "vapor lock" that can damage the engine. A cold air intake can cool down the air flow before entering into the internal combustion engine in order to increase engine power and efficiency and to improve throttle response and fuel economy in most cases.

A conventional cold air intake is an external device installed into the vehicle in order to incorporate with the air intake system of the vehicle for increasing the amount of oxygen available for combustion with fuel. Since cooler air has a higher density, cooling the air intake and fuel promotes an increased density of fuel. Denser fuel combined with cold intake air promotes better and more efficient burning of the fuel, so as to generate more power, greater fuel efficiency, and less greenhouse gas emissions.

Generally speaking, the conventional cold air intake comprises a heat shield isolating heat from the engine to the air intake pipe such that airflow can be directly guided to the engine while being heated by the engine. However, the heat shield can only prevent the airflow being heated up by the heat generated from the engine; it does not cool down the airflow before the airflow enters into the engine.

SUMMARY OF THE PRESENT INVENTION

The invention is advantageous in that it provides an intake enhancement system, which substantially cools the air/fuel intake before the air/fuel intake enters into the internal combustion engine so as to maximize the efficiency of the internal combustion engine. Therefore, cooling the air intake and fuel promotes an increased density of fuel, wherein denser fuel combined with cold intake air promotes better and more efficient burning of fuel to consequently generate more power, greater fuel efficiency and less greenhouse gas emissions.

Another advantage of the invention is to provide an intake enhancement system, wherein the combustion element, i.e. the airflow and/or a flow of fuel, is cooled down by the existing air conditioning or the intercooler of the vehicle while being energy efficient.

Another advantage of the invention is to provide an intake enhancement system, wherein the combustion element is guided to flow along the heat exchanging duct of the heat exchanger of the vehicle in a spiral direction for enhancing the heat-exchange between the combustion element and the heat exchanging agent.

Another advantage of the invention is to provide an intake enhancement system, which does not require altering the original structural design of the heat exchanger of the vehicle to incorporate with the intake enhancement system, so as to minimize the installation cost of the present invention to be used in the vehicle.

Another advantage of the invention is to provide an intake enhancement system, which does not involve complicated or expensive mechanical components to minimize the manufacturing cost of the present invention.

Another advantage of the invention is to provide an intake enhancement system, wherein no expensive or complicated mechanical structure is required to be employed in the present invention in order to achieve the above mentioned objects. Therefore, the present invention successfully provides an economical and efficient solution for providing an intake enhancement system to incorporate in any existing vehicle having a heat exchanger in order to cool down the combustion element before the combustion element enters into the internal combustion engine.

Additional advantages and features of the invention will become apparent from the description which follows, and may be realized by means of the instrumentalities and combinations particular point out in the appended claims.

According to the present invention, the foregoing and other objects and advantages are attained by an intake enhancement system for a vehicle which comprises a combustion engine and a heat exchanger for generating a cooling effect. The intake enhancement system comprises an intake cooling unit for delivering a combustion element to the combustion engine, wherein the intake cooling unit is thermally conducted with the heat exchanger for heat-exchanging with the combustion element so as to substantially cool down the combustion element along the intake cooling unit before the combustion element delivers to the combustion engine.

In accordance with another aspect of the invention, the present invention comprises a method of enhancing an efficiency of an internal combustion engine of a vehicle, comprising the following steps:

(1) Guide a combustion element to thermally conduct with a heat exchanging agent of a heat exchanger of the vehicle.

(2) Heat-exchange the combustion element with the heat exchanging agent to cool down the combustion element before entering into the combustion engine.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
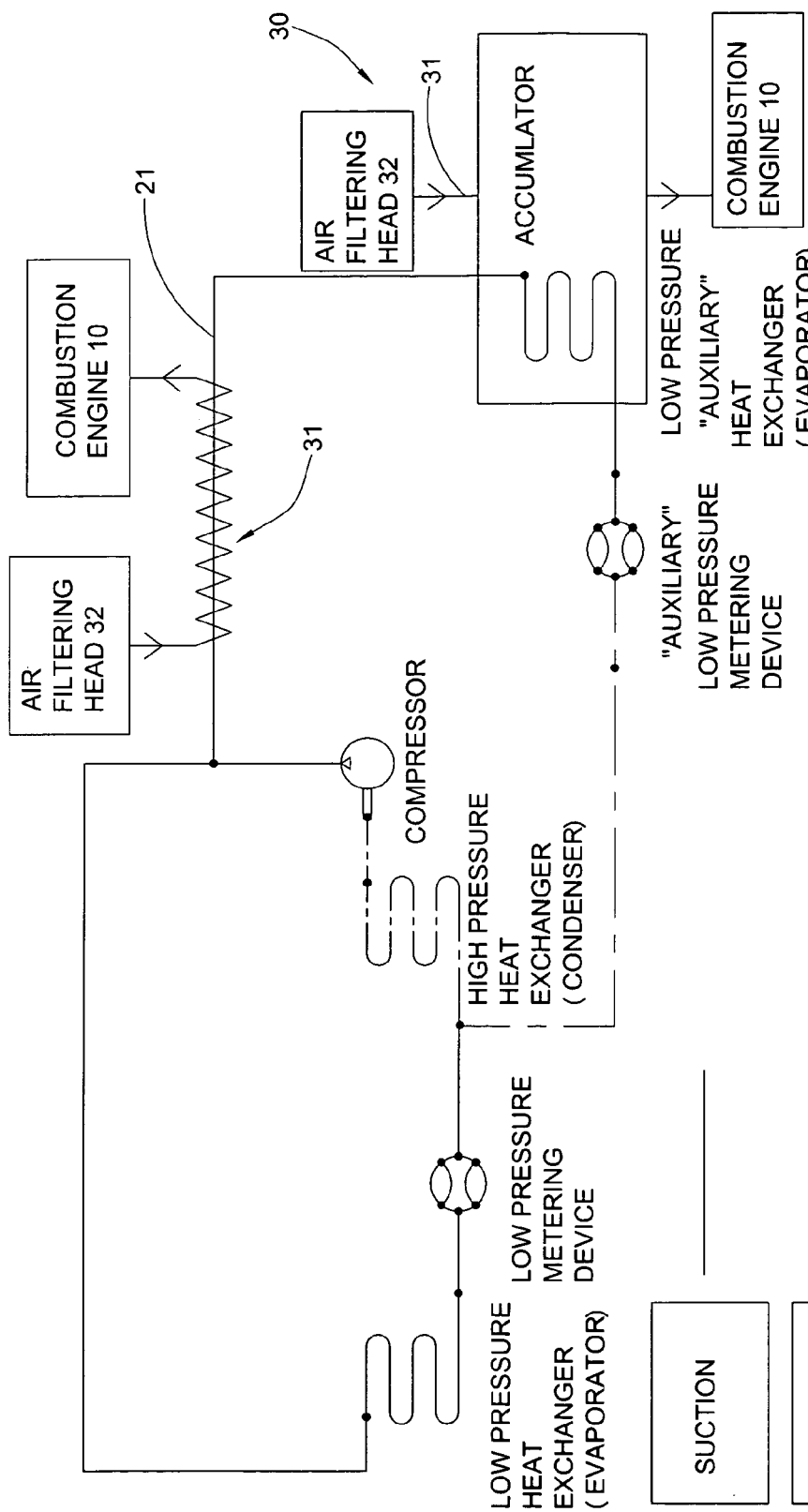
FIG. 1A is flow diagram of an intake enhancement system according to a first preferred embodiment and its alternative of the present invention, illustrating airflow as the combustion element being detoured to heat-exchange with heat exchanger of the vehicle.
Figure 1B:
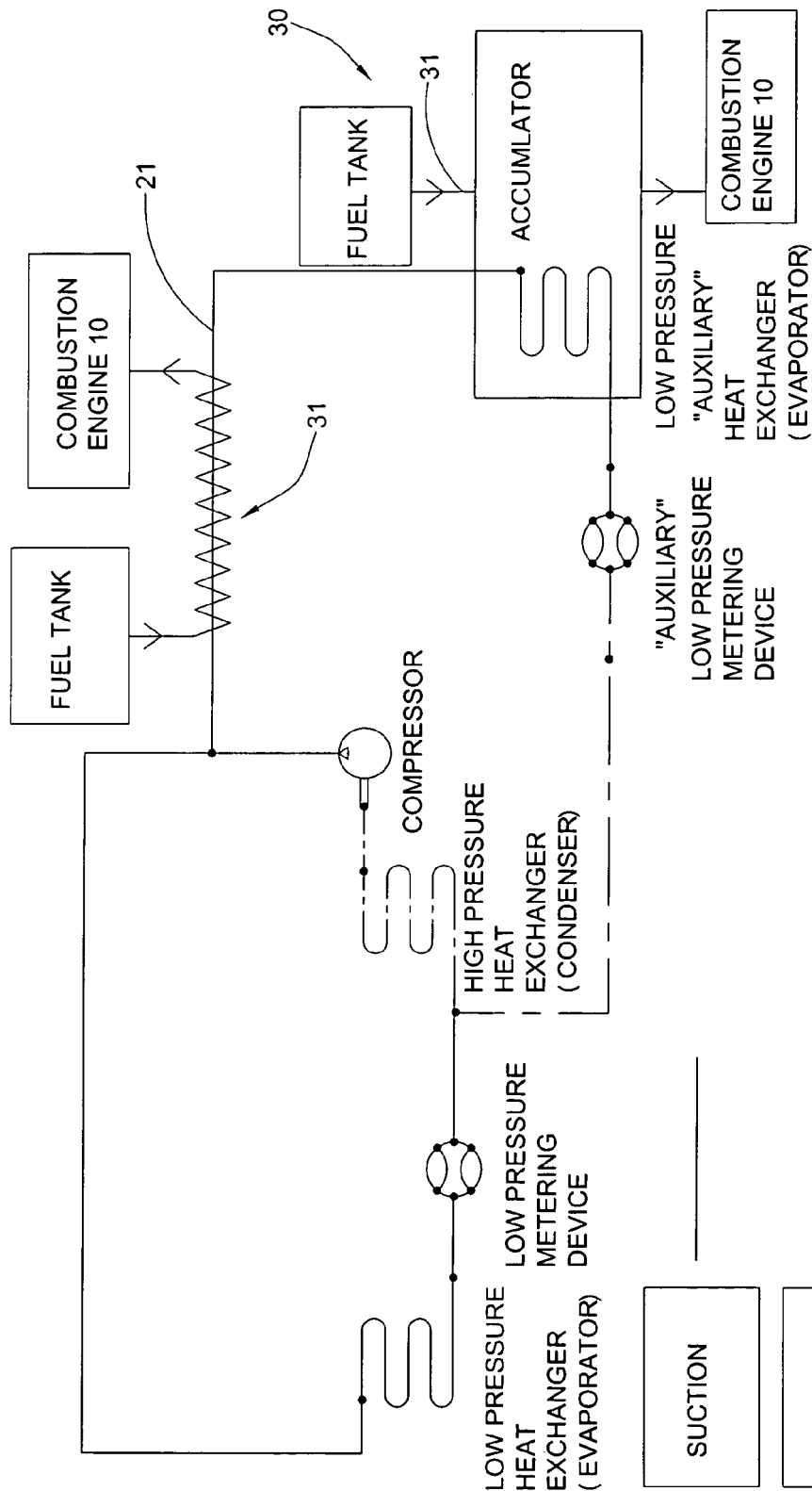
FIG. 1B is flow diagram of an intake enhancement system according to the first preferred embodiment and its alternative of the present invention, illustrating fuel as the combustion element being detoured to heat-exchange with heat exchanger of the vehicle.

Referring to FIGS. 1A and 1B of the drawings, an intake enhancement system for a vehicle according to a preferred embodiment of the present invention is illustrated. Accordingly, the vehicle, such as a car, motorcycle, boat, or truck, generally comprises an internal combustion engine 10 and a heat exchanger 20 for generating a cooling effect.

The heat exchanger 20, which can be an air conditioning system, comprises a compressor, a condenser, an evaporator, and a heat exchanging line operatively connecting the compressor, condenser, and evaporator for guiding a flow of heat exchanging agent, such as refrigerant, among the compressor, condenser, and evaporator for heat exchange. In particular, a heat exchanging duct 21 is formed along the heat exchanging line to operatively link all components of the heat exchanger 20.

The heat exchanger 20 further defines a low pressure side and a high pressure side. The low pressure side of the heat exchanger 20 is defined at the portion of the heat exchanging duct 21 extending from the evaporator to the compressor, wherein the heat exchanging agent is guided to flow along the heat exchanging duct 21 at the low pressure side from the evaporator to the compressor. The high pressure side of the heat exchanger 20 is defined at the portion of the heat exchanging duct 21 extending from the compressor to the evaporator through the condenser, wherein the heat exchanging agent is guided to flow along the heat exchanging duct 21 at the high pressure side from the compressor to the evaporator through the condenser. In particular, the heat exchanger 20 further defines a suction section and a discharge section as shown in FIGS. 1A and 1B.

Accordingly, for some vehicles, especially for heavy duty trucks or luxury car, the heat exchanger 20 further comprises an auxiliary heat exchanger for enhancing the cooling effect of the main heat exchanger. The intake enhancement system of the present invention is adapted to incorporate with the heat exchanger 20, including the main heat exchanger and the auxiliary heat exchanger, in order to cool down the combustion element before entering into the combustion engine 10. The combustion element is airflow and/or a flow of fuel delivering to the combustion engine 10 for combustion.

The heat exchanger 20 can also be embodied as an intercooler of the vehicle, wherein the intercooler is an air-to-air or air-to-liquid heat exchange device for internal combustion engine 10 of the vehicle to improve the volumetric efficiency thereof.

According to the preferred embodiment, the intake enhancement system comprises an intake cooling unit 30 for delivering the combustion element to the combustion engine 10, wherein the intake cooling unit 30 is thermally conducted with the heat exchanger 20 for heat-exchanging with the combustion element so as to substantially cool down the combustion element along the intake cooling unit 30 before the combustion element delivers to the combustion engine 10.

It is worth mentioning that the combustion element for the combustion engine 10 is a mixture of airflow and fuel. The airflow is drawn into the combustion engine 10 along an air intake line of the vehicle. The fuel is guided to flow from a fuel tank to the combustion engine 10 along a fuel intake line of the vehicle. Accordingly, there are two ways to heat-exchange the combustion element with the heat exchanging agent. First, the flow of combustion element is detoured to the heat exchanger 20 as illustrated in the first embodiment. Second, as an alternative, the flow of heat exchanging agent is detoured from the heat exchanger 20 to heat-exchange with the combustion element as illustrated in the second embodiment.

Figure 7:
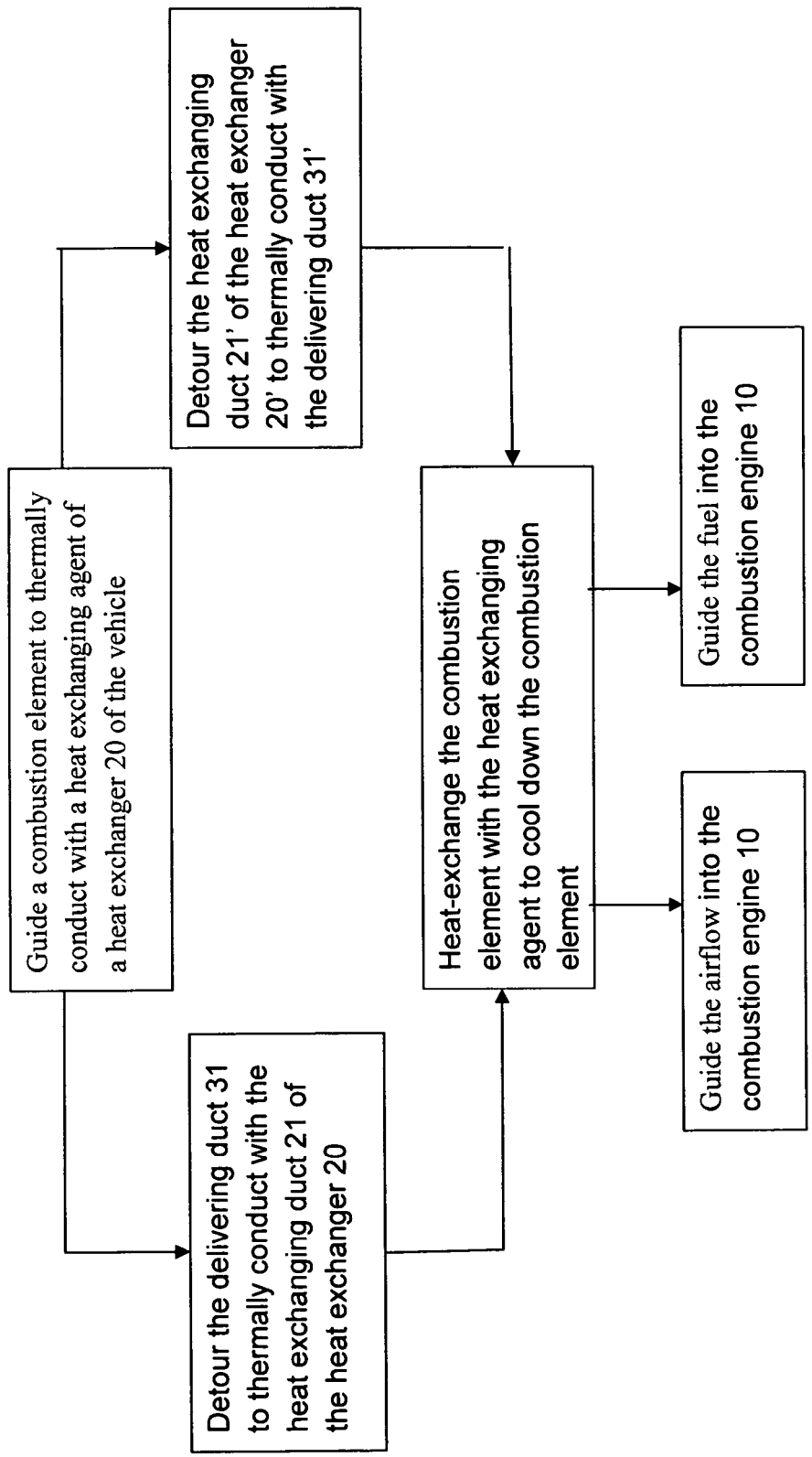
FIG. 7 is a flow diagram illustrating the method of enhancing an efficiency of the internal combustion engine of the vehicle by the intake enhancement system according to the above first and second embodiments of the present invention.

As shown in FIG. 7, the present invention further comprises a method of enhancing an efficiency of the internal combustion engine 10 of the vehicle, which comprises the following steps.

(A) Guide the combustion element to thermally conduct with the heat exchanging agent of the heat exchanger 20 of the vehicle.

(B) Heat-exchange the combustion element with the heat exchanging agent to cool down the combustion element before entering into the combustion engine 10.

As shown in FIGS. 1A and 1B, the intake cooling unit 30 comprises a delivering duct 31 for guiding the combustion element to the combustion engine 10, wherein the delivering duct 31 is directly contacted with the heat exchanging duct 21 to thermally conduct the combustion element with the heat exchanging agent. In other words, the combustion element is detoured to the AC line in order to cool down the combustion element.

Accordingly, the delivering duct 31 is detoured to the heat exchanger 20 to thermally conduct with the heat exchanging duct 21 of the heat exchanger 20 before operatively extending to the combustion engine 10, such that when the combustion element passes along the delivering duct 31, the combustion element is heat-exchanged with the heat exchanging agent within the heat exchanging duct 21 before entering into the combustion engine 10.

According to the preferred embodiment, when the combustion element is guided to flow along the delivering duct 31 in the step (A) and the heat exchanging agent is guided to flow along the heat exchanging duct 21, the combustion element will heat-exchange with the heat exchanging agent through the thermal conduction between the delivering duct 31 and the heat exchanging duct 21. Furthermore, the flowing direction of the combustion element is opposite to the flowing direction of the heat exchanging agent. It is worth mentioning that the delivering duct 31 is extended along the heat exchanging duct 21 at the low pressure side of the heat exchanger 20 for safety purpose. In other words, the combustion element is guided to thermally conduct with the heat exchanging agent at the low pressure side of the heat exchanger 20. In particular, the delivering duct 31 is extended along the heat exchanging duct 21 at the suction section of the heat exchanger 20.

In particular, the delivering duct 31 is integrated into the suction section of the heat exchanger 20 for delivering cold intake air and fuel to the combustion engine 10.

For enhancing the heat-exchange between the combustion element and the heat exchanging agent in the step (B), the combustion element is guided to flow along the delivering duct 31 in a flow-directing manner to thermally conduct with the heat exchanging agent along the heat exchanging duct 21 in the step (A). Accordingly, the combustion element is guided to preferably flow along the delivering duct 31 in a spiral direction to thermally conduct with the heat exchanging agent along the heat exchanging duct 21.

Figure 2:
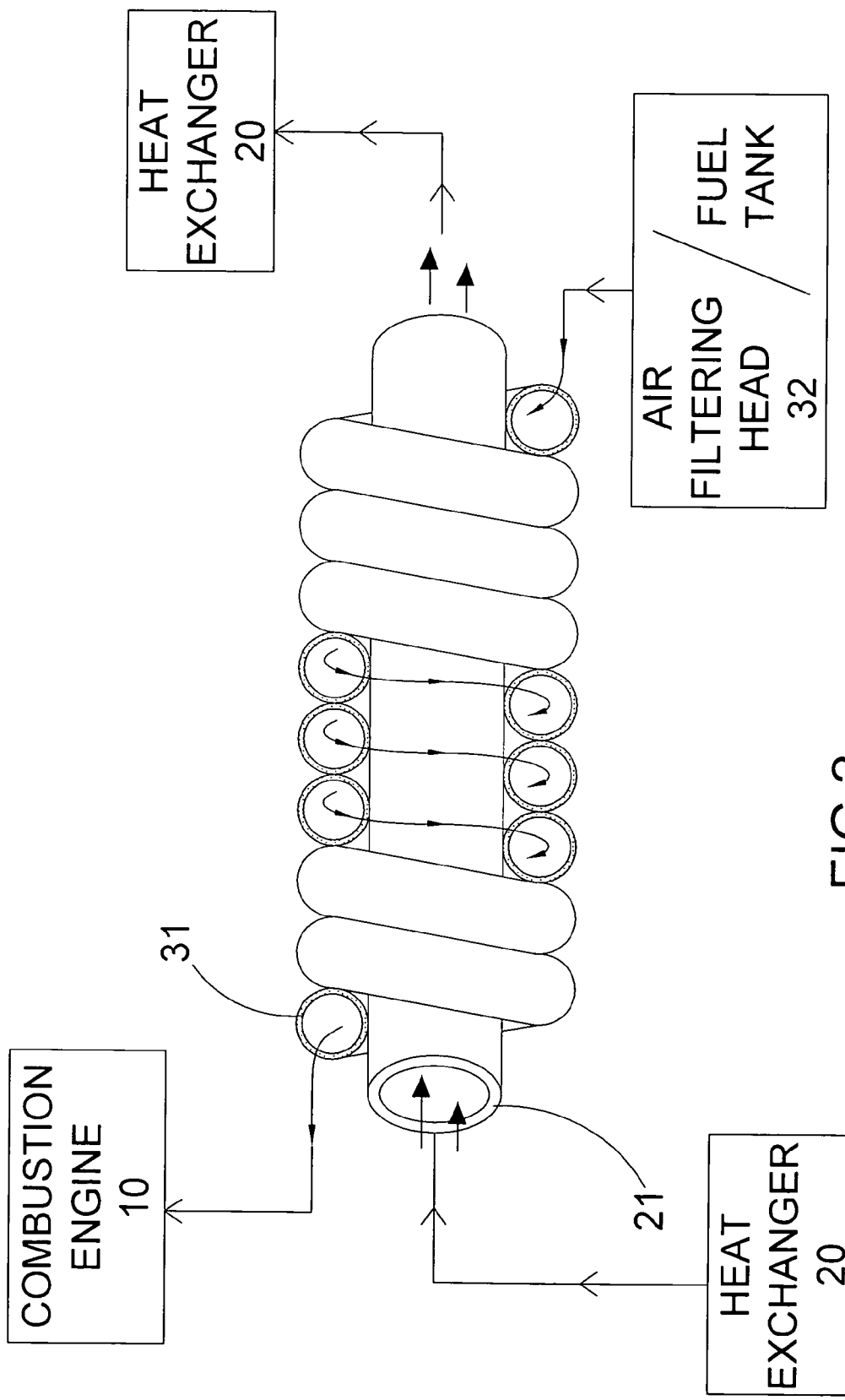
FIG. 2 is a perspective view of a delivering duct of the intake enhancement system according to the above first preferred embodiment of the present invention, illustrating the delivering duct directly extended along the heat exchanging duct in a spiral configuration.

In order to guide the combustion element to flow in a spiral direction, the delivering duct 31 is spirally extended along the heat exchanging duct 21, as shown in FIG. 2, such that the combustion element flows along the delivering duct 31 to heat-exchange the heat exchanging agent. In other words, the delivering duct 31 is directly extended along the heat exchanging duct 21 in a spiral configuration.

Figure 3:
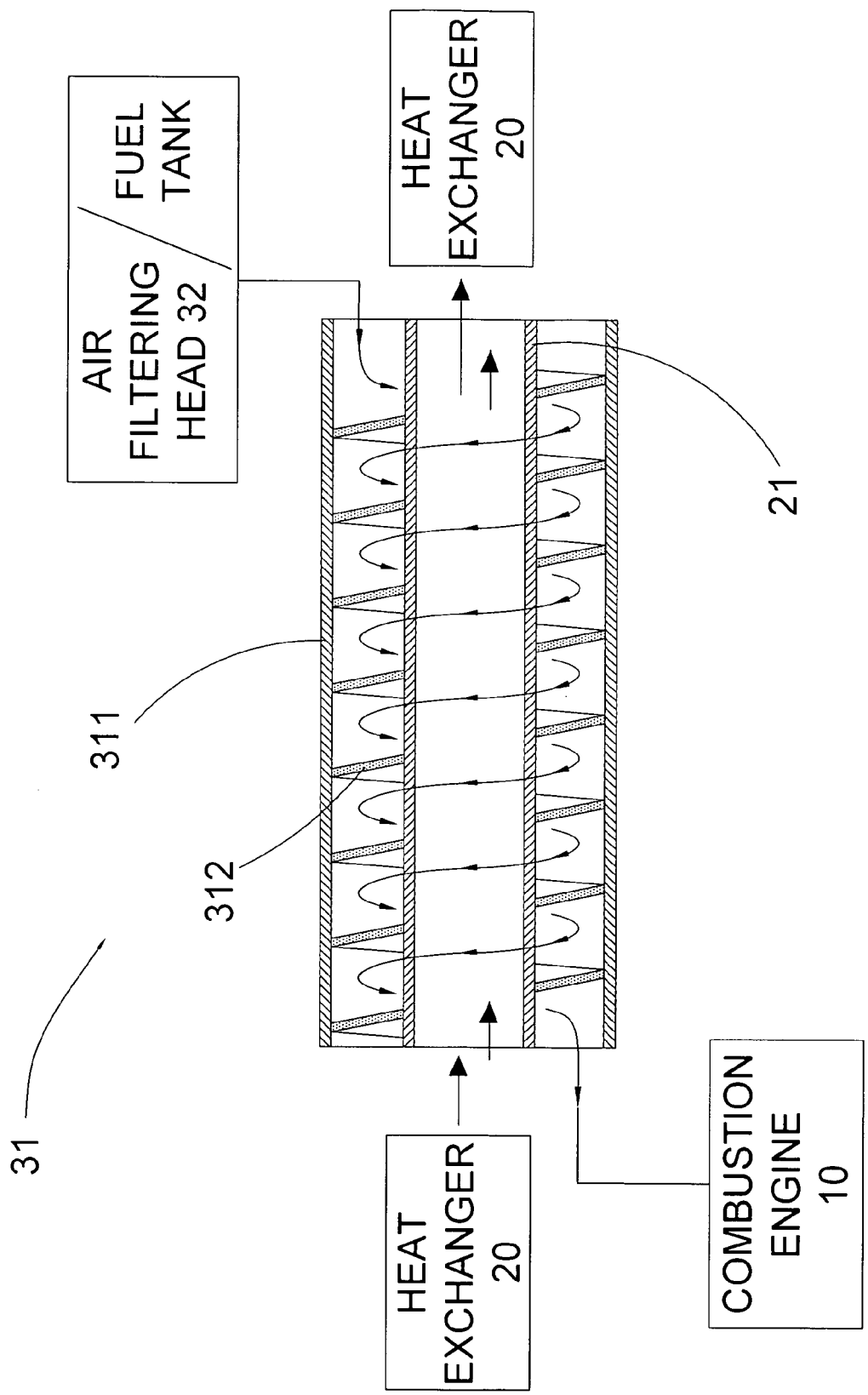
FIG. 3 illustrates an alternative mode of the delivering duct of the intake enhancement system according to the above first preferred embodiment of the present invention, illustrating the delivering duct and the heat exchanging duct in tube-in-tube configuration.

Alternatively, the delivering duct 31 comprises a tubular duct body 311 for encircling the heat exchanging duct 21 therewithin and a guiding fin 312 spirally extended at an inner surface of the duct body 311 for guiding the combustion element passing along the duct body 311 in a spiral direction so as to effectively heat-exchange with the heat exchanging agent by increasing the contact surface area, as shown in FIG. 3. In other words, the delivering duct 31 and the heat exchanging duct 21 form a tube-in-tube configuration.

It is appreciated that the combustion element and the heat exchanging agent are guided to flow into a baffle in vessel structure, wherein the heat exchanging agent is guided to flow at an inner vessel while the combustion element is guided to flow at an outer vessel while baffles thereat to guide the flow direction of the combustion element. Therefore, prolonging the flow of the combustion element within the vessel, the combustion element can be efficiently heat-exchanged with the heat exchanging agent.

For airflow cooling configuration, the combustion element is embodied as the airflow being cooled down by the heat exchanger 20 before the airflow enters into the combustion engine 10. In other words, the delivering duct 31 is an air delivering duct to guide the airflow. The existing air intake system generally comprises an air filtering head 32 for drawing ambient air into the combustion engine 10 along the air intake line. Accordingly, the delivering duct 31 is tapped to the air intake line to detour the airflow between the air filtering head 32 and the combustion engine 10. In other words, the airflow will guide to pass through the delivering duct 31 from the air filtering head 32 to the combustion engine 10. In other words, the first end of the delivering duct 31 is coupled with the air filtering head 32 for the ambient air to enter into the delivering duct 31, while the second end of the delivering duct 31 is operatively extended to the combustion engine. Therefore, the airflow is guided to enter into the delivering duct 31 through the air filtering head 32 and is then cooled down by heat-exchanging with the heat exchanging agent before the airflow enters into the combustion engine 10, as shown in FIG. 1A.

Alternatively, the heat exchanger 20 further comprises an accumulator for use in a refrigeration circuit for vehicle air conditioning system, wherein the accumulator comprises a reservoir containing the heat exchanging agent, i.e. refrigerant. The heat exchanging agent passes from the evaporator to the accumulator to separate any remaining liquid heat exchanging agent from the gaseous heat exchanging agent, and to allow gaseous heat exchanging agent to return to the compressor.

The delivering duct 31, i.e. the air delivering duct, is detoured from the air intake line and is extended through the accumulator, wherein the delivering duct 31 is returned back to the air intake line. Therefore, the airflow is guided to enter into the delivering duct 31 and is then cooled down by heat-exchanging with the heat exchanging agent within the accumulator before the airflow enters into the combustion engine 10, as shown in FIG. 1A.

For fuel cooling configuration, the combustion element is embodied as the flow of fuel being cooled down by the heat exchanger 20 along the fuel intake line before the fuel enters into the combustion engine 10. Accordingly, the delivering duct 31 is a fuel delivering duct to guide the flow of fuel, wherein the delivering duct 31 is extended from the fuel tank to the combustion engine 10 through the heat exchanger 20, as shown in FIG. 1B.

Accordingly, the delivering duct 31 is tapped to the fuel intake line to detour the the flow of fuel between the fuel tank and the combustion engine 10. In other words, the fuel will guide to pass through the delivering duct 31 from the fuel tank to the combustion engine 10. In other words, the first end of the delivering duct 31 is coupled with the fuel tank for the fuel to enter into the delivering duct 31, while the second end of the delivering duct 31 is operatively extended to the combustion engine. Therefore, the fuel is guided to enter into the delivering duct 31 from the fuel tank and is then cooled down by heat-exchanging with the heat exchanging agent before the fuel enters into the combustion engine 10, as shown in FIG. 1B.

Alternatively, the delivering duct 31, i.e. the fuel delivering duct, is detoured from the fuel intake line and is extended through the accumulator, wherein the delivering duct 31 is returned back to the fuel intake line. Therefore, the fuel is guided to enter into the delivering duct 31 and is then cooled down by heat-exchanging with the heat exchanging agent within the accumulator before the fuel enters into the combustion engine 10, as shown in FIG. 1B.

It is appreciated that two delivering ducts 31 are configured as the air delivering duct and the fuel delivering duct respectively to guide the airflow and fuel to the combustion engine 10 through the heat exchanger 20. In other words, both airflow and fuel will be cooled down before the airflow and fuel enter into the combustion engine 10. Therefore, by cooling the air intake and fuel promotes an increased density of fuel, wherein denser fuel combined with cold intake air promotes better and more efficient burning of fuel so as to consequently generate more power, greater fuel efficiency and less greenhouse gas emissions.

Figure 4A:
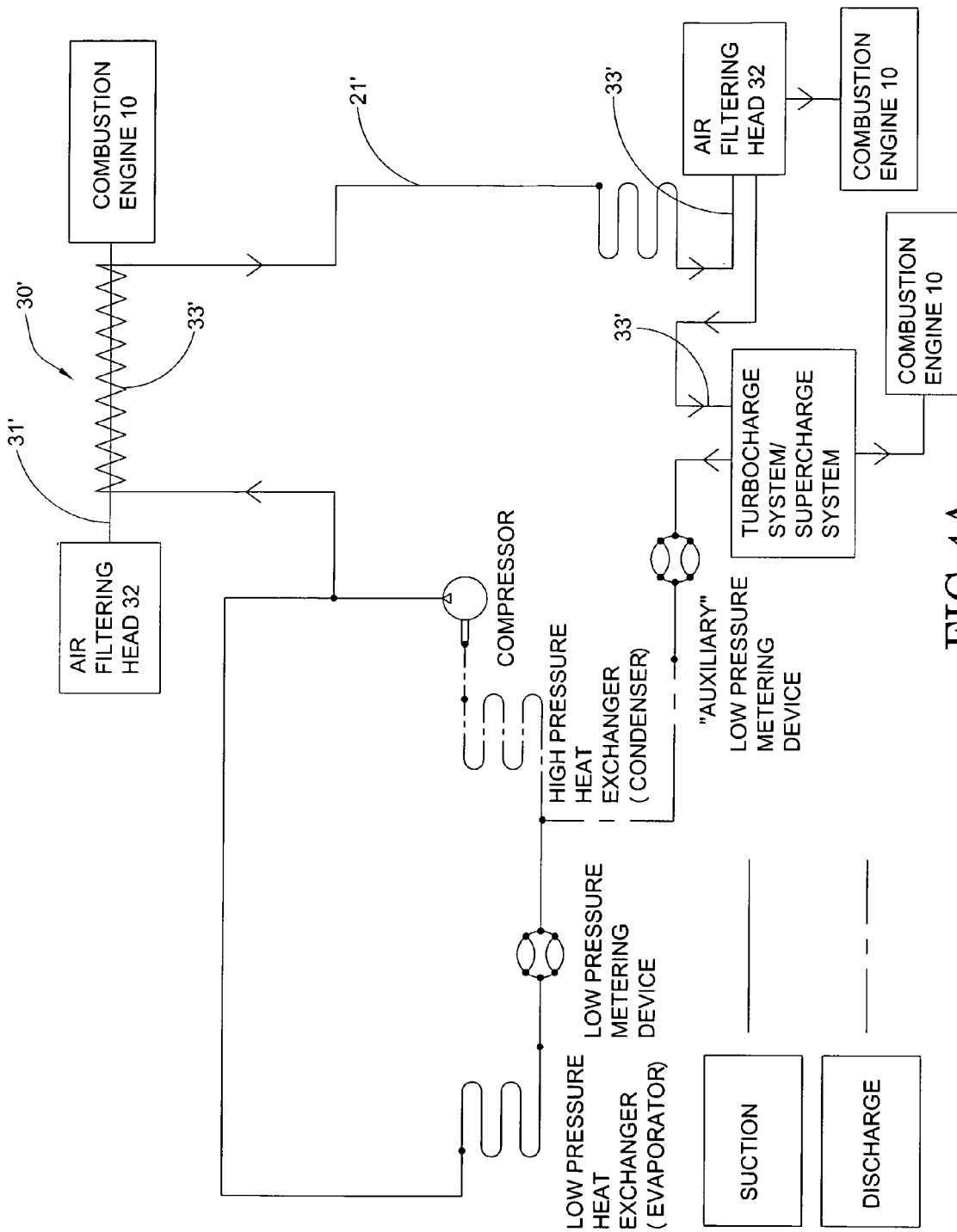
FIG. 4A is flow diagram of an intake enhancement system according to a second preferred embodiment and its alternative of the present invention, illustrating the heat exchanging agent being detoured to heat-exchange with airflow as the combustion element.
Figure 4B:
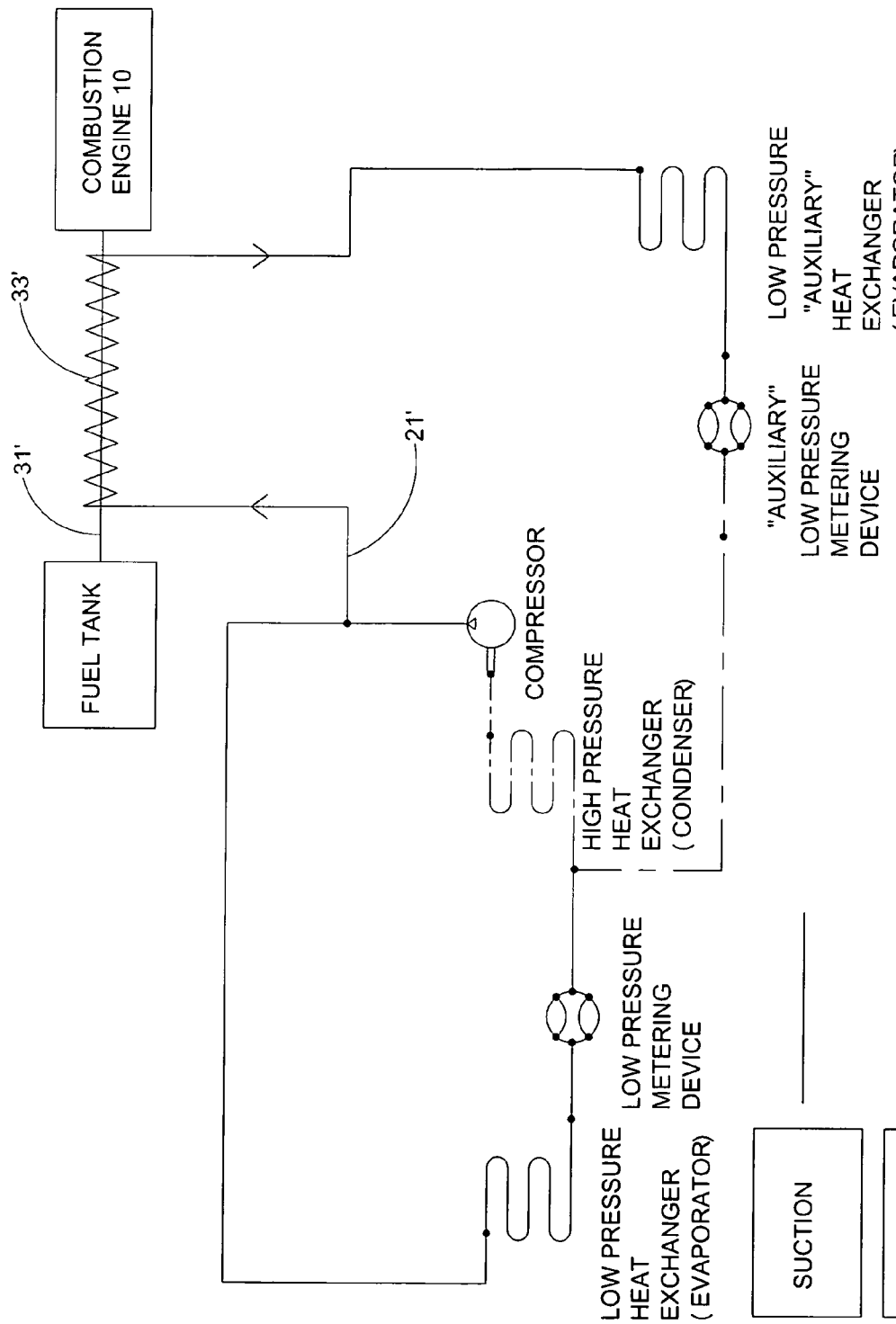
FIG. 4B is flow diagram of an intake enhancement system according to a second preferred embodiment and its alternative of the present invention, illustrating the heat exchanging agent being detoured to heat-exchange with fuel as the combustion element.

As shown in FIGS. 4A and 4B, an intake enhancement system according to a second embodiment illustrates an alternative mode of the present invention, wherein the structural configuration of the intake cooling unit 30' according to the second embodiment is the same as that of the first embodiment, except the heat exchanger 20' is tapped to detour the heat exchanging agent to cool down the combustion element. In other words, the heat exchanging agent is detoured from its AC (air conditioning) line to cool down the combustion element.

According to the second embodiment, in order to detour the heat exchanging agent, the intake cooling unit 30' further comprises a cooling extension duct 33' for operatively extending from the heat exchanging duct 21' to detour a flow of the heat exchanging agent, wherein the cooling extension duct 33' can be spirally extended along the delivering duct 31' to heat-exchange the combustion element with the heat exchanging agent.

The cooling extension duct 33' has two ends operatively coupled with a suction section of the heat exchanging duct 21' especially at the low pressure side of the heat exchanger 20'. Instead of directly guiding the heat exchanging agent to flow along the heat exchanging duct 21', the heat exchanging agent is guided to detour from the heat exchanging duct 21' to the cooling extension duct 33' and is then guided to flow back to the heat exchanging duct 21'.

The combustion element will heat-exchange with the heat exchanging agent through the thermal conduction between the delivering duct 31' and the cooling extension duct 33'. Furthermore, the flowing direction of the combustion element is opposite to the flowing direction of the heat exchanging agent.

Figure 5:
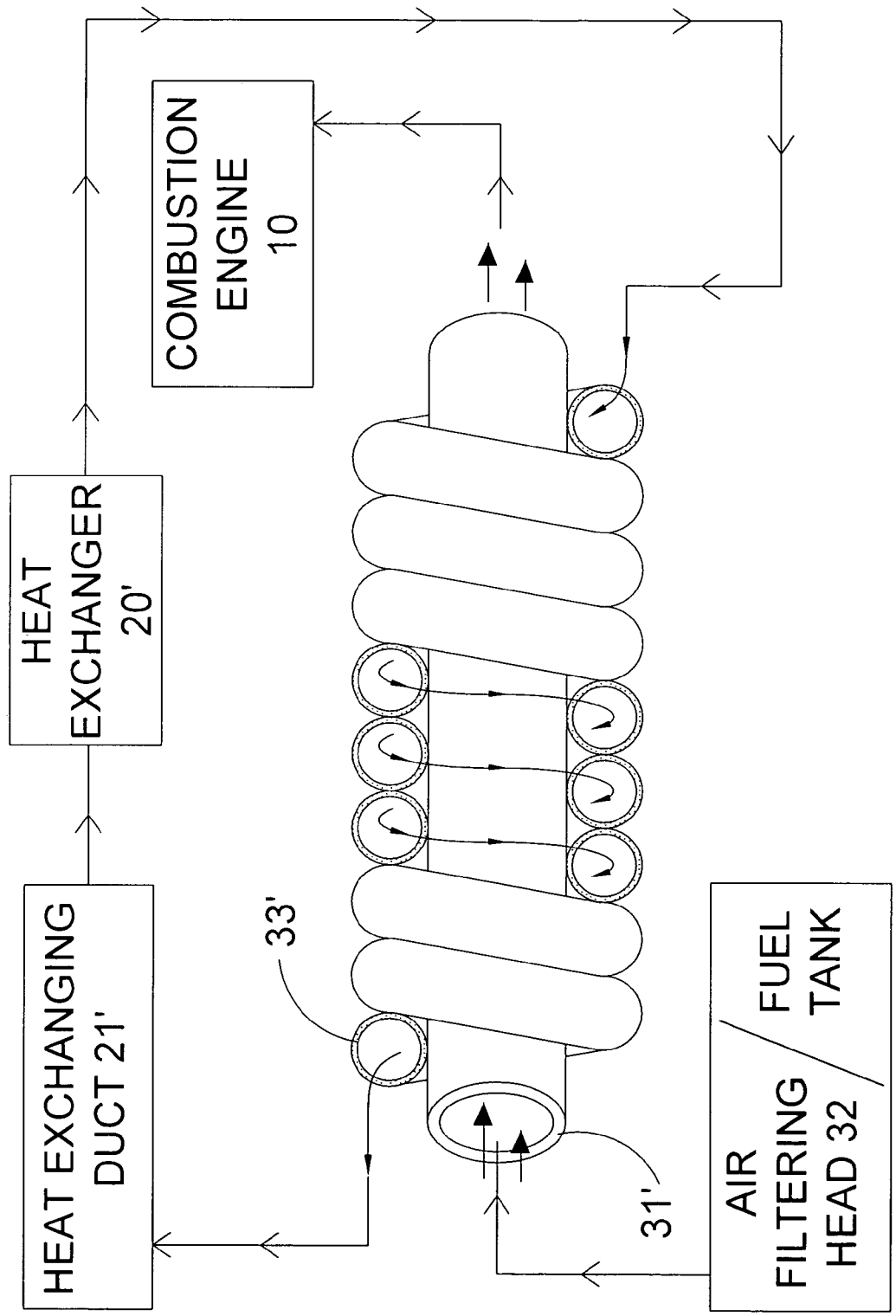
FIG. 5 is a perspective view of the cooling extension duct of the intake enhancement system according to the above second preferred embodiment of the present invention, illustrating the cooling extension duct directly extended along the delivering duct in a spiral configuration.
Figure 6:
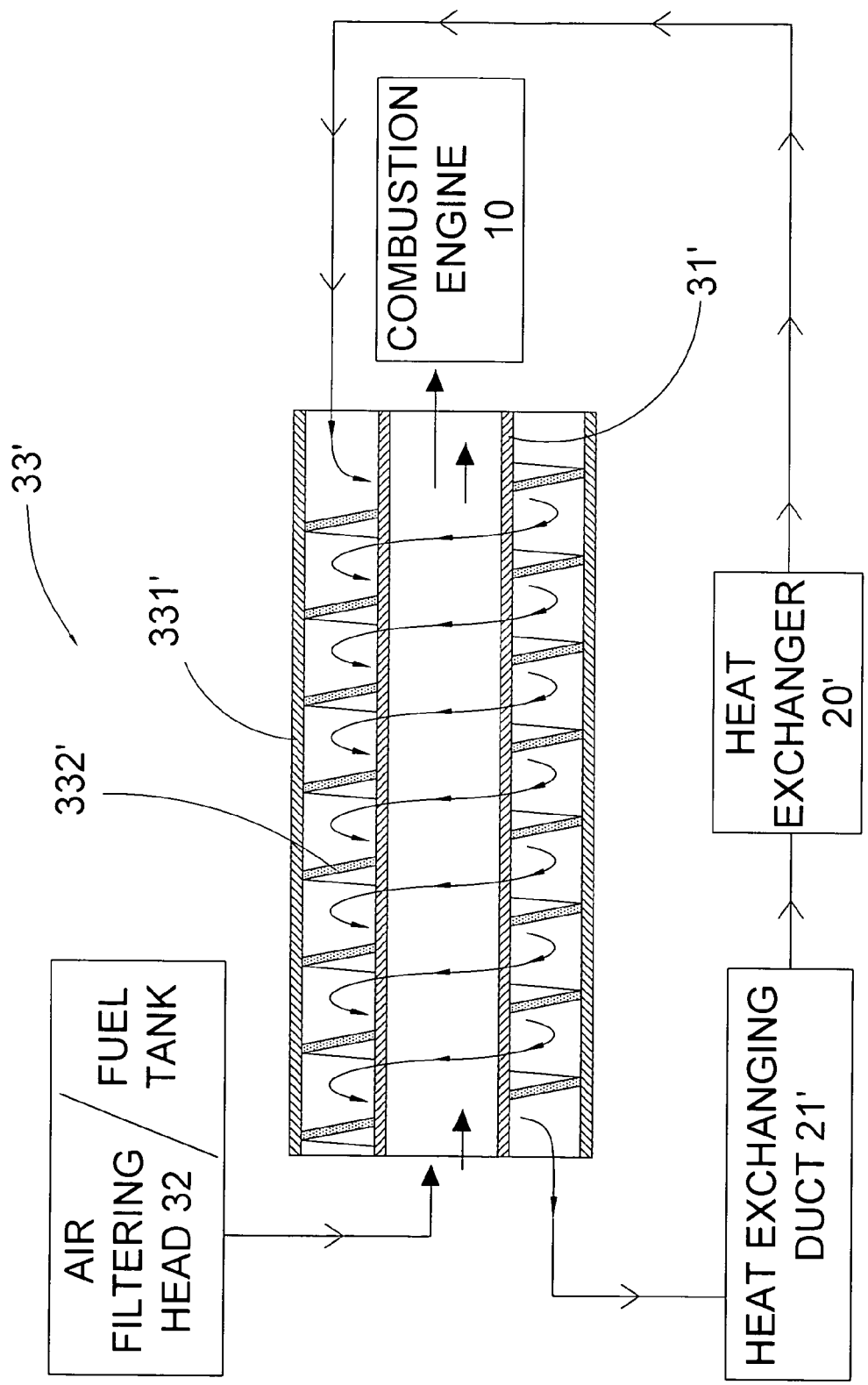
FIG. 6 illustrates an alternative mode of the cooling extension duct of the intake enhancement system according to the above second preferred embodiment of the present invention, illustrating the cooling extension duct and the delivering duct in tube-in-tube configuration.

Accordingly, the heat exchanging agent is guided to flow along the cooling extension duct 33' in a spiral direction to thermally conduct with the combustion element along the delivering duct 31'. As shown in FIG. 5, the cooling extension duct 33' is directly extended along the delivering duct 31' in a spiral configuration. Alternatively, the comprises a tubular duct body 331' for encircling the delivering duct 31' therewithin and a guiding fin 332' spirally extended at an inner surface of the duct body 331' for guiding the heat exchanging agent passing along the duct body 331' in a spiral direction so as to effectively heat-exchange with the combustion element, as shown in FIG. 6. In other words, the delivering duct 31' and the cooling extension duct 33' form a tube-in-tube configuration. Alternatively, the combustion element and the heat exchanging agent are guided to flow into a baffle in vessel structure, wherein the heat exchanging agent is guided to flow at an inner vessel while the combustion element is guided to flow at an outer vessel while baffles thereat to guide the flow direction of the combustion element. Therefore, prolonging the flow of the combustion element within the vessel, the combustion element can be efficiently heat-exchanged with the heat exchanging agent.

For airflow cooling configuration, the combustion element is embodied as the airflow being cooled down by the heat exchanger 20' before the airflow enters into the combustion engine 10. In other words, the delivering duct 31' is an air delivering duct to guide the airflow. Accordingly, the cooling extension duct 33' is tapped to extend to the air delivering duct, wherein when the airflow is guided to pass through the air delivering duct 31' from the air filtering head 32 to the combustion engine 10, the airflow will be cooled down by the heat exchanging agent by heat-exchanging between the air delivering duct 31' and the cooling extension duct 33'. Therefore, the airflow is guided to enter into the delivering duct 31' from the air filtering head 32 and is then cooled down by heat-exchanging with the heat exchanging agent before the airflow enters into the combustion engine 10, as shown in FIG. 4A.

Alternatively, the cooling extension duct 33' is directly extended to the air filtering head 32, wherein when the air enters into the air filtering head 32, the air will be directly cooled down by the heat exchanging agent passing through the cooling extension duct 33' before entering into the combustion engine 10, as shown in FIG. 4A.

For fuel cooling configuration, the combustion element is embodied as the flow of fuel being cooled down by the heat exchanger 20' along the fuel intake line before the fuel enters into the combustion engine 10. Accordingly, the delivering duct 31' is a fuel delivering duct to guide the flow of fuel, wherein the delivering duct 31' is extended from the fuel tank to the combustion engine 10 through the heat exchanger 20', as shown in FIG. 4B.

Accordingly, the cooling extension duct 33' is tapped to extend to the fuel delivering duct, wherein when the fuel is guided to pass through the fuel delivering duct 31' from the fuel tank to the combustion engine 10, the fuel will be cooled down by the heat exchanging agent by heat-exchanging between the fuel delivering duct 31' and the cooling extension duct 33'. Therefore, the fuel is guided to enter into the fuel delivering duct 31' from the fuel tank and is then cooled down by heat-exchanging with the heat exchanging agent before the fuel enters into the combustion engine 10, as shown in FIG. 4B.

It is worth mentioning that the intake cooling unit 30' can also incorporated the vehicle having the turbocharge system and supercharge system. Accordingly, for turbocharge configuration, the cooling extension duct 33' is tapped to extend to the turbocharge system, wherein the heat exchanging agent is guided to flow to the turbocharge system in order to cool down the air being drawn by the turbocharge system.

For supercharge configuration, the cooling extension duct 33' is tapped to extend to a chiller unit of the supercharge system, wherein the heat exchanging agent is guided to flow to the chiller unit of the supercharge system. It is worth mentioning that the heat exchanging agent is detoured to flow along the cooling extension duct 33' to cool the liquid, such as glycol, within the chiller unit so as to further cool down the air being cooled by the chiller. In other words, the liquid in the chiller will be further cooled to cool down the airflow efficiently.

Figure 8:
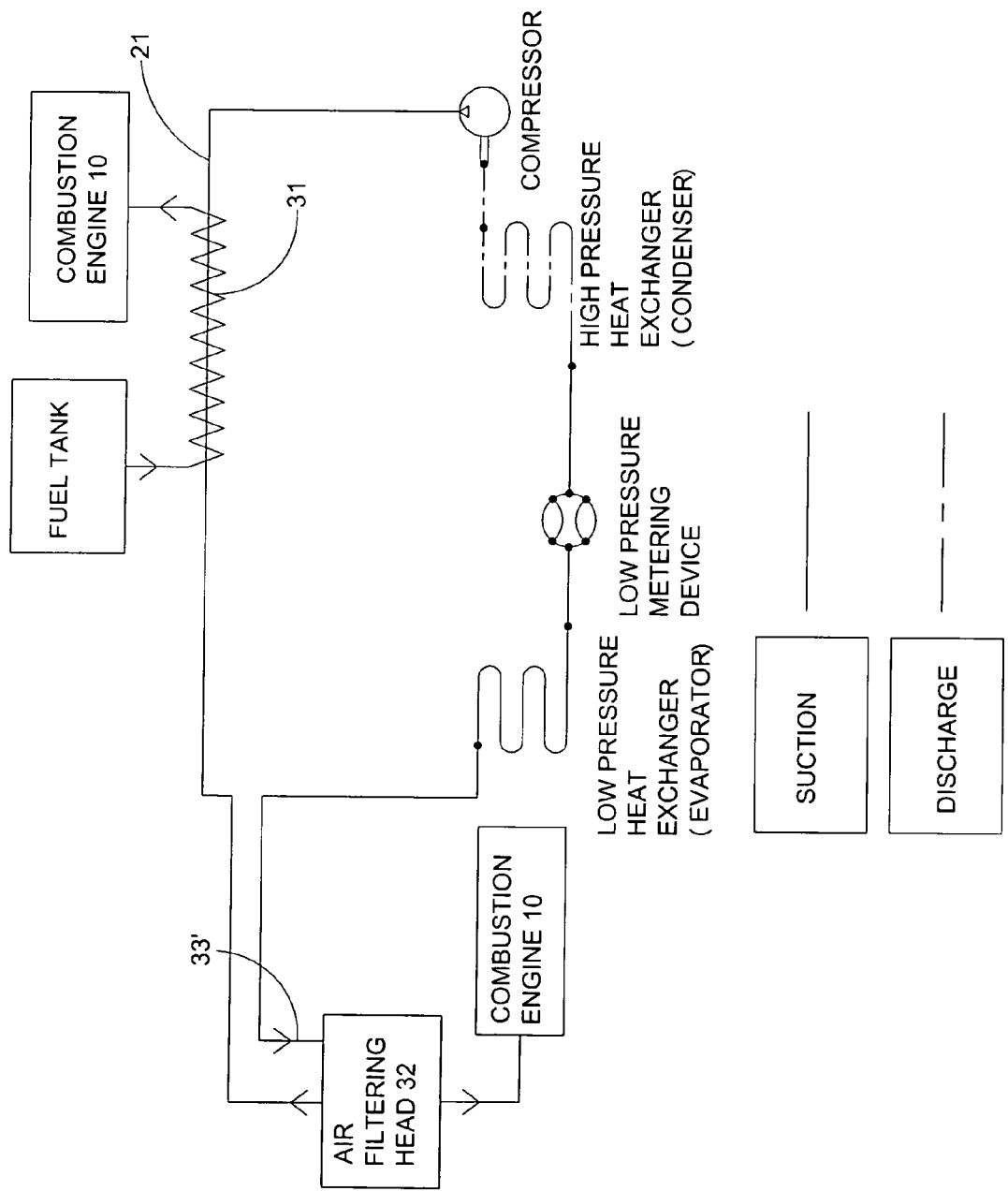
FIG. 8 is flow diagram of an intake enhancement system illustrating both airflow and fuel being cooled by the intake enhancement system before delivering to the combustion engine.

For best configuration, both airflow and fuel will be cooled before entering into the combustion engine 10 as shown in FIG. 8. Accordingly, the cooling extension duct 33' is directly extended to the air filtering head 32 to directly cool down the airflow drawn at the air filtering head 32. In the meantime, the delivering duct 31 is tapped to the fuel intake line to detour the fuel between the fuel tank and the combustion engine 10. Therefore, the fuel is guided to pass through the delivering duct 31 from the fuel tank to the combustion engine 10 to heat-exchange with the heat exchanging agent within the heat exchanging duct 21. The fuel is then cooled down before the fuel enters into the combustion engine 10.

Therefore, both airflow and fuel will be cooled before entering into the combustion engine 10. It is worth mentioning that a safety valve, such as a low pressure valve, can be incorporated with the intake cooling unit 30, 30' for modulating the pressure, wherein the safety valve is automatically shut off in responsive to the pressure, in order to prevent the combustion element being cooled below its freezing point.

It is worth mentioning that the intake cooling unit 30 can also firstly cool down the fuel before entering into the combustion engine 10, while the cold fuel can then be detoured to cool the airflow before entering into the combustion engine 10. In other words, the fuel and airflow will be subsequently cooled by the intake cooling unit 30. It is appreciated that the intake cooling unit 30 will cool the airflow first and the cold airflow will then cool the fuel in order to subsequently cool the airflow and the fuel before entering into the combustion engine 10.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intake enhancement system for a vehicle including a fuel tank, a combustion engine and an air conditioning system, said intake enhancement system comprising:
    a chiller connected sequentially between a low pressure metering device of the air conditioning system and a compressor of the air conditioning system, the chiller receiving a cold refrigerant flow from the low pressure metering device and a coolant flow, the refrigerant flow and the coolant flow in separate chambers in the chiller, wherein heat is conducted through walls of said chiller unit from said coolant flow to said refrigerant flow;
    a fuel line carrying fuel from the fuel tank and the combustion engine, the fuel line passing through the chiller cooperating with the refrigerant flow to cool the fuel carried in the fuel line;
    a coolant to air heat exchanger in fluid communication with the chiller to receive the coolant flow from the chiller and to return the coolant flow to the cooler;
    an intake air cooling unit including a delivering duct for delivering a flow of intake air through the coolant to air heat exchanger before delivering said intake air to said combustion engine.

2. The intake enhancement system of claim 1, wherein the chiller is a accumulator of the air conditioning system.

3. The intake enhancement system of claim 1, wherein the chiller resides in a first coolant path parallel to a second coolant path through an evaporator of the air conditioning system.

4. The intake enhancement system of claim 1, wherein the coolant flow includes glycol.

5. The intake enhancement system of claim 1, wherein the combustion engine includes a turbocharger and the coolant to air heat exchanger cools the intake air between the turbocharger and the combustion engine.

6. The intake enhancement system of claim 1, wherein the combustion engine includes a supercharger and the coolant to air heat exchanger cools the intake air between the supercharger and the combustion engine.

* * * * *